Figure 3:
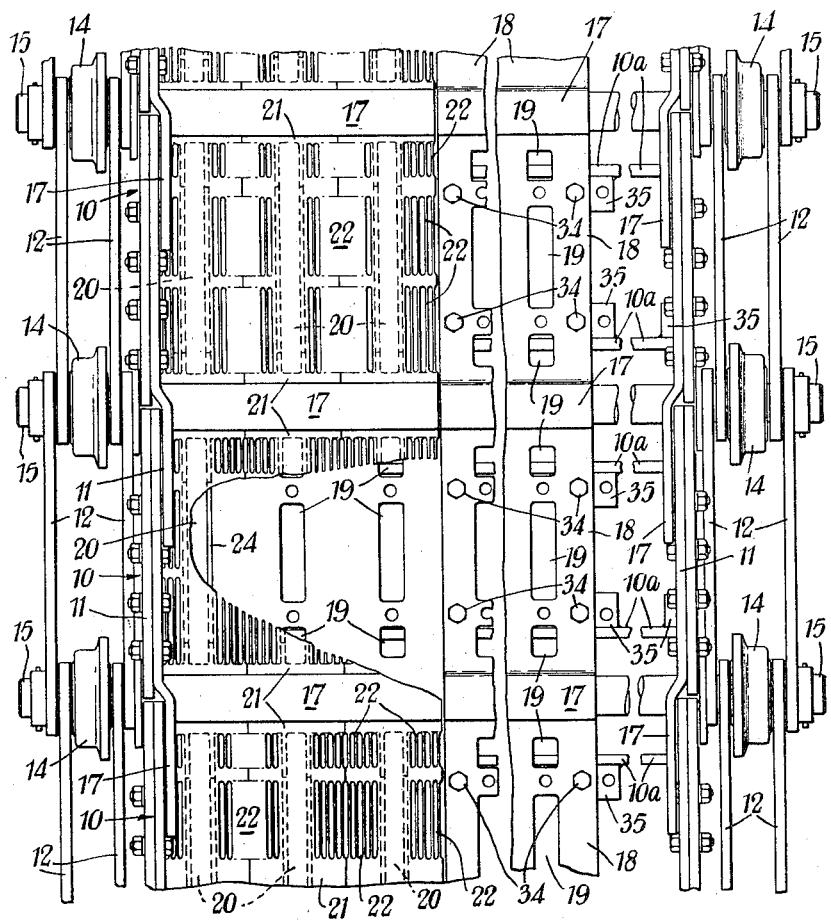

Dec. 2, 1958  J. W. MEREDITH ET AL  2,862,308
COOLING OF SINTERED AND OTHER SOLID
MATERIALS OF INDUSTRIAL PROCESSES
Filed June 20, 1956  6 Sheets-Sheet 1
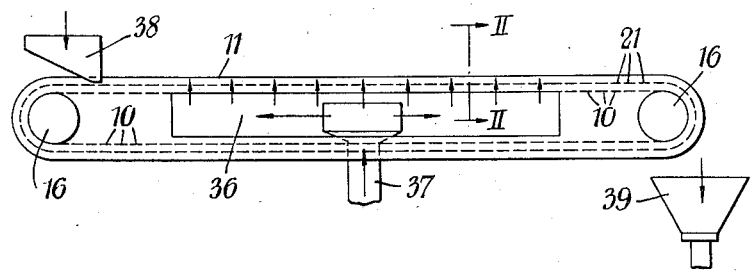
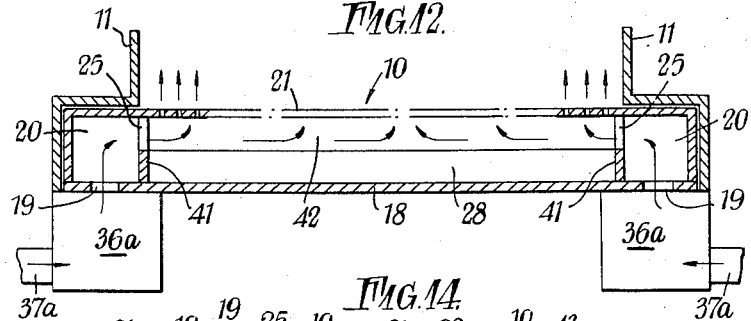
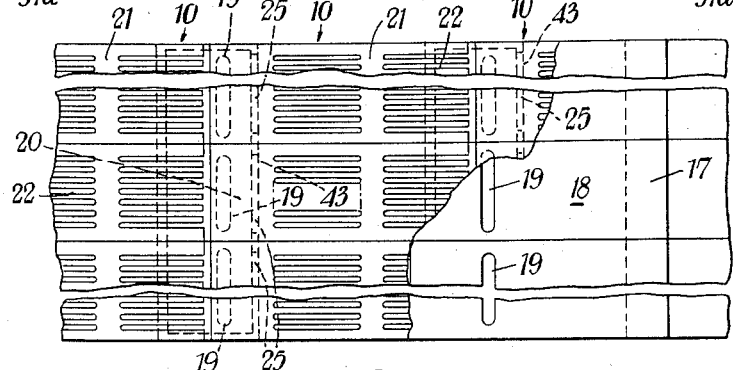
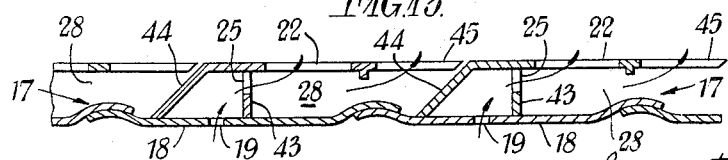
Inventors
James W. Meredith,
Albert J. Rogers
by Sommers & Young
Attorneys

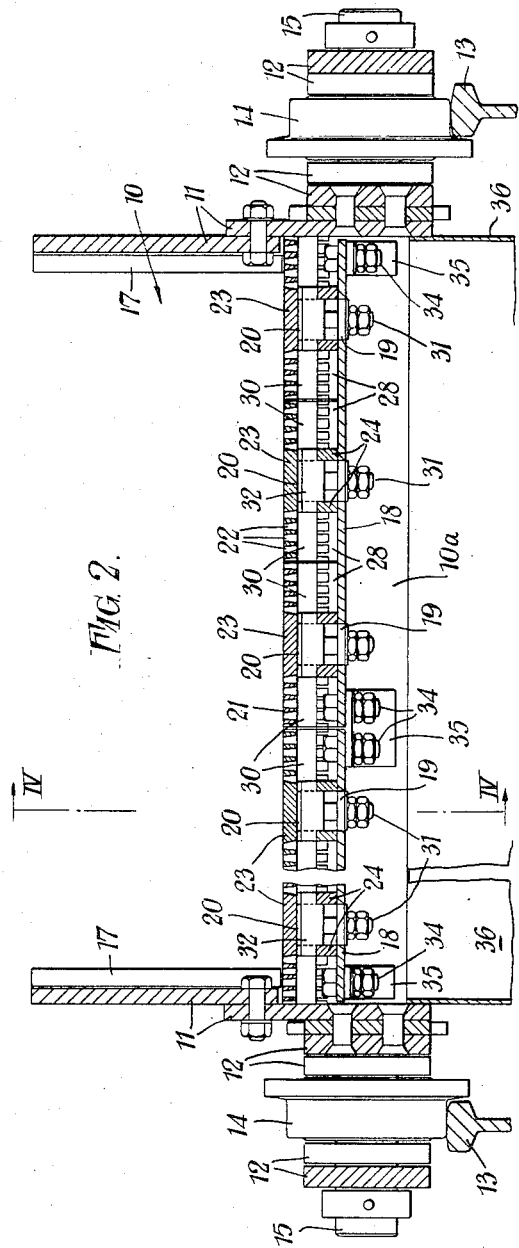

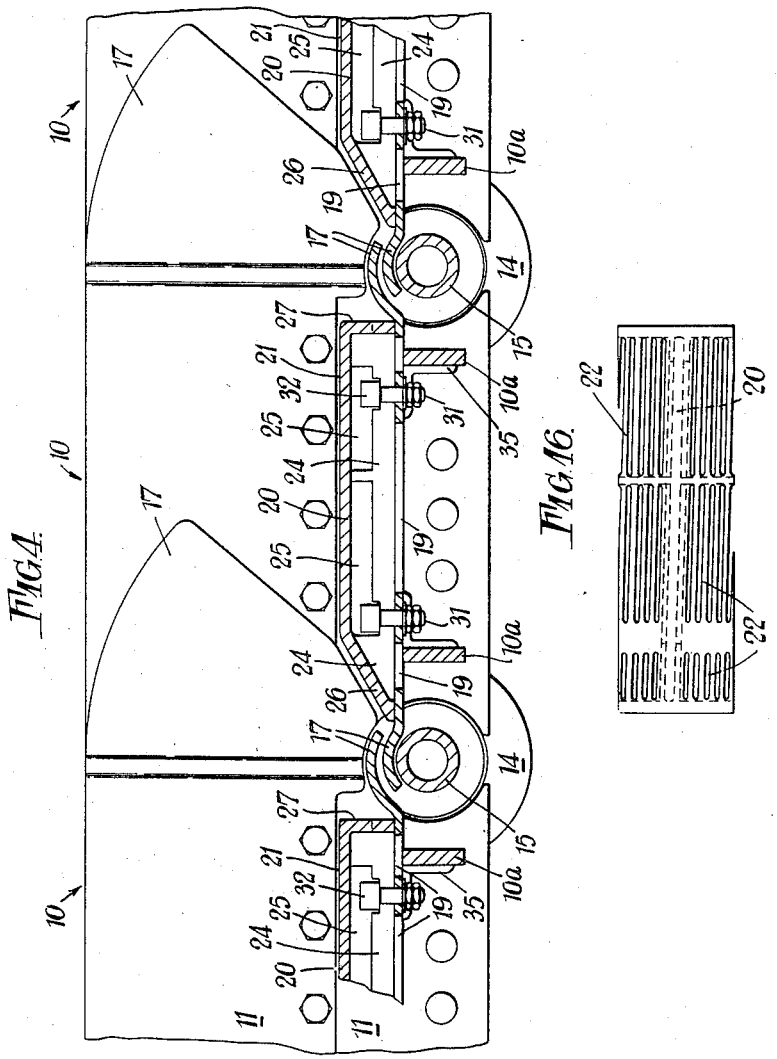

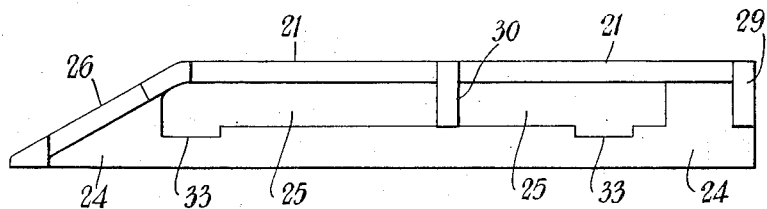
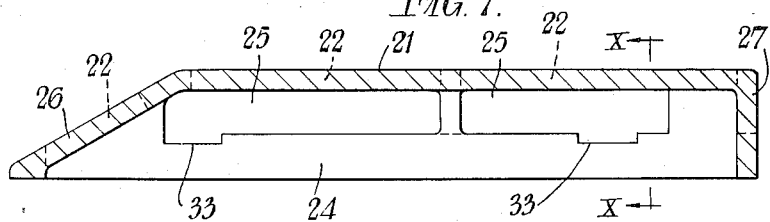
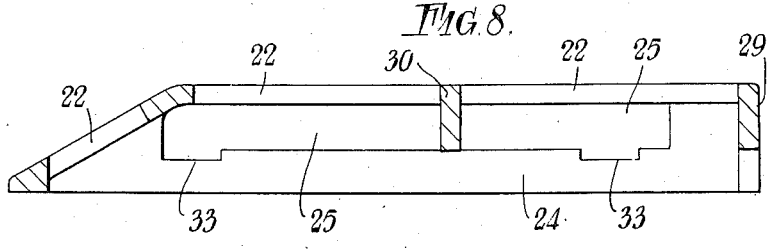
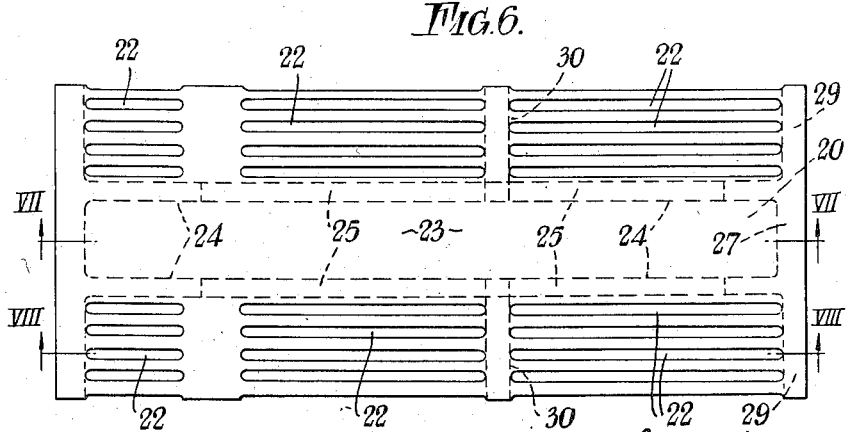

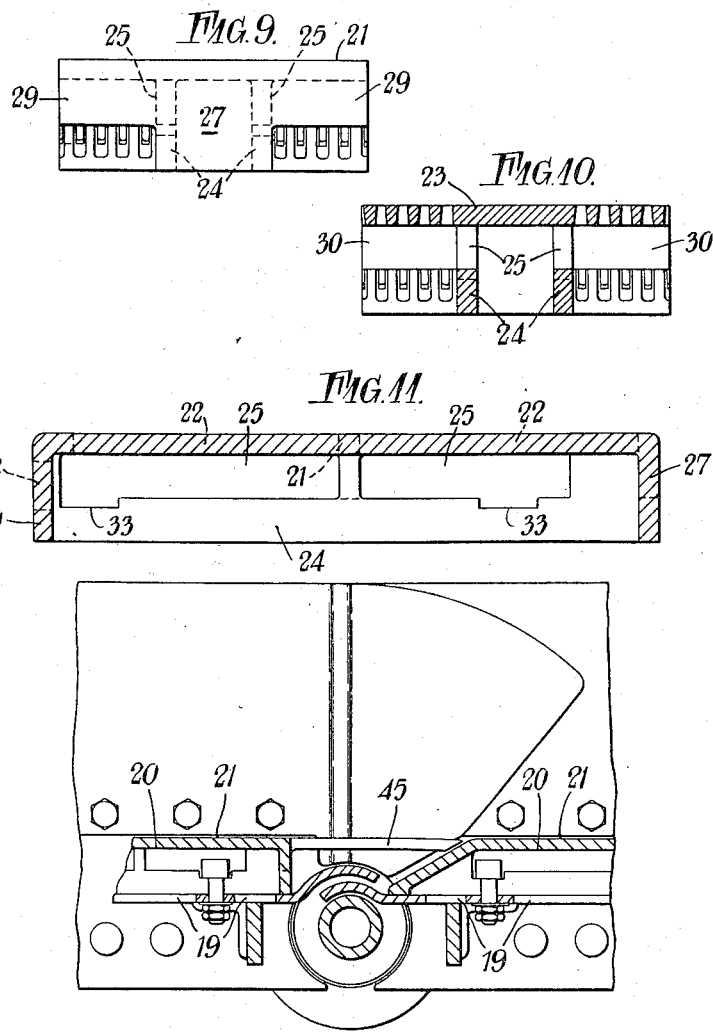

United States Patent Office 2,862,308
Patented Dec. 2, 1958

2,862,308

COOLING OF SINTERED AND OTHER SOLID MATERIALS OF INDUSTRIAL PROCESSES

James William Meredith and Albert Thomas Rogers, London, England, assignors to Huntington Heberlein and Company Limited, London, England Application June 20, 1956, Serial No. 592,627

Claims priority, application Great Britain November 28, 1955

11 Claims. (Cl. 34—236)

This invention comprises improvements relating to the cooling of sintered and other solid material of industrial processes, for example sintered ore and coke or other carbonaceous matter. More particularly, it is concerned with an improved apparatus, suitable for the above purpose, which is of the kind comprising an endless movable series of trays or pans which are apertured for passage of a gaseous cooling medium into the lower part thereof and are fitted with a perforate surface spaced above the bottom of the trays or pans for supporting the solid material, and enabling it to be subjected to the action of such medium, during movement of the said series in the longitudinal direction.

According to the present invention, we provide beneath the perforate material-supporting surface of the trays or pans, and between such surface and the bottom of the trays or pans, a number of conduits to which the gaseous cooling medium has entry through apertures in such bottom, and from which conduits the said medium has exit through lateral apertures thereof into space, beneath said perforate surface, in which material that falls through this perforate surface is capable of being collected so that substantially it does not escape through the bottom of the trays or pans.

Suitably, the cooling-medium conduits in the trays or pans are situated beneath imperforate regions interposed in the perforate material-supporting surface and are arranged so as to provide alongside them, beneath perforate regions of the aforesaid surface, compartments in which material which may fall through such perforate regions can be collected, the lateral apertures for exit of the gaseous cooling medium from the said conduits being situated in the wall of the conduits substantially immediately below the said surface.

Preferably, several of the cooling-medium conduits are embodied in any of the trays or pans of the series and are extended lengthwise of the series and spaced apart from one another transversely of the series. However, in appropriate cases, any of the trays or pans of the series may have one or more of the cooling-medium conduits extending transversely of the series, or disposed in an inclined setting, in plan, with relation to the centre-line of such series. Moreover, combinations of the several arrangements of the cooling-medium conduits thus described may be employed.

In order to enable the invention to be readily understood, reference is directed by way of example to the accompanying drawings in which:

Figure 1 is a diagrammatic central longitudinal section of one form of apparatus according to the present improvements, Figure 2 a fragmentary transverse section on the line II—II of Figure 1 to a larger scale and partly broken away, Figure 3 a fragmentary plan of the outward or upper flight of the apparatus shown in Figure 1 but to a larger scale and showing parts broken away, Figure 4 a fragmental section on the line IV—IV of Figure 2, Figure 5 an elevation of one of the grate or grid sections of a tray or pan of the apparatus, Figure 6 a plan of Figure 5, Figure 7 a section on the line VII—VII of Figure 6, Figure 8 a section on the line VIII—VIII of Figure 6, Figure 9 an elevation at the right-hand end of Figure 5, Figure 10 a section on the line X—X of Figure 7, Figure 11 a view similar to Figure 7 illustrating a modification of the grates or grids of the trays or pans, Figure 12 a transverse section showing, more or less diagrammatically a modified construction of the apparatus, Figure 13 a fragmentary longitudinal section illustrating, more or less diagrammatically, another modified construction of apparatus, Figure 14 a fragmentary plan, partly broken away, of the upper flight of the apparatus shown in Figure 13, Figure 15 a fragmentary longitudinal section illustrating a modification of the grate or grid construction of the trays or pans, and Figure 16 a plan view depicting another modified construction of the trays or pans.

According to Figures 1 to 4, the trays or pans 10, having vertical sides 11, are carried by chains built up from pairs of pivotal links 12 and adapted to run on rails 13 by means of wheels 14 fitted at the pivots 15 between the links. The chains are endless and mounted on sprockets or rollers 16 at the ends of the apparatus. The several trays or pans (hereinafter termed trays) of the series overlap one another at sides and ends at 17 so that the arrangement is more or less of equivalent nature to a troughed belt conveyor comprising an upper operative flight and a lower return flight. If desired, each tray 10 may be supported or reinforced beneath by cross bars 10a welded to the sides 11. At the bottom 18, the trays have their end edge parts circularly curved arch-fashion where, at 17, they overlap the pivots 15, see Figure 4. Otherwise, the bottom of the trays is flat and has apertures in the form of slots 19 at numerous places in lines spaced apart from one another transversely of the trays. It is at these places that conduits 20 for conducting gaseous cooling medium (in this case air) to grates or grids 21, constituting the perforate material-supporting surface of the trays, are situated. There is a grate 21 for each tray extended from one upstanding side 11 to the other of the trays and made in six sections disposed side by side. Three sections only are seen on each tray in Figure 3, because the right-hand half of the grate is there shown removed to disclose the tray construction beneath. Each grate has sets of grate apertures 22 and, beneath an imperforate or blank part 23, Figures 6 and 10, each section of the grate is cast with a pair of depending vertical parts 24. The latter space the flat part of the grate at a predetermined short distance above the bottom of the trays and form side walls of the aforesaid cooling-medium conduits 20 which are hereinafter termed air conduits. These air conduits extend longthwise of the series of trays and in their side walls they have air exit apertures 25 lying immediately below the imperforate parts 23 of the grate, see Figures 2, 4 and 10. The slots 19 in the bottom of the trays serve for entry of air into the conduits. Conveniently, the air conduits are closed at their rear end by the imperforate parts of a sloping rear portion 26 of the grate and at their forward end by a vertical part 27, see Figures 4, 6, 7 and 9. On the other hand, the spaces or compartments 28 (hereinafter termed compartments), which exist between the air conduits and beneath the perforate parts of the grate, are open at the ends, the rear end through the grate apertures 22 in the sloping portion 26 and the forward end either fully open or, as shown, open below lateral web parts 29 extending from the part 27 aforesaid, see Figures 5, 6, 8 and 9. The sections of the grate may also have similar lateral web parts 30 intermediate of their length see Figures 5, 6, 8 and 10. The grate sections are secured to the bottom of the trays by bolts 31, the heads 32 of which are engaged with recesses 33 in the side walls 24 of the air conduits. The bottom 18 of the trays is also made in sections which are laid side by side and fixed by bolts 34 to angle pieces 35 welded to the cross bars 10a, see Figures 2 to 4. The trays 10 in the outward or upper flight of the apparatus move over a cooling air chamber 36, Figures 1 and 2, to which air is supplied under appropriate pressure through the conduit 37. Alternatively, or in addition, a suction hood may be provided over such flight as will be understood. Suitable feed and discharge chutes or the like for material to be treated, or the cooled material, as the case may be, are provided at the ends of the said flight of the conveyor, as indicated respectively at 38 and 39 in Figure 1.

The apparatus thus described is appropriate for the cooling of hot sinter discharged from a sintering machine. In operation, the hot sinter is fed at 38 to, and is carried along in a layer of suitable depth on, the trays of the upper flight of the apparatus. During the travel of the sinter with this flight, air under pressure from the cooling air chamber 36 passes into the air conduits 20 of the successive trays through the entry apertures 19 in the bottom 18 of the trays and is delivered laterally through the exit slots 25 in the side walls 24 of these conduits into the compartments 28 between or on either side of the air conduits. The air then passes through the grate openings 22 and the open ends of said compartments into, and is distributed through, the bed of material on the trays of the operative flight. Any relatively fine material which may fall through the grate openings 22 will collect in the compartments referred to and as these latter are open forwardly, such material will discharge from the compartments, along with the cooled material, as the trays pass one by one over the sprockets or rollers 16 at the far end of the conveyor. Because the slots 25, in the side walls 24 of the air conduits 20 are spaced above the bottom of the trays, the fine material collecting in the said compartments is not likely to escape through the air conduits and the slots 19 in the bottom of the trays and fall into the cooling air chamber 36 with obvious difficulties of removal. The grates 21, likewise the air conduits 20, terminate at front and rear slightly short of the arched overlapping parts of the bottom of the trays at 17. As a result, the surface for support of the material under treatment, is somewhat of a castellated outline (Figure 4) so that, on the operative flight of the conveyor, the material covers the open ends of the compartments 28. The said arched overlapping parts of the bottom 18 of the trays assist suitable discharge of the cooled material at the far end of the conveyor as will be understood. By use of the apparatus the temperature of the sinter can be reduced from about 600° C. to about 150° C., though obviously other limits may be provided for and other materials than sinter cooled in the same or a similar form of apparatus.

According to the modification shown in Figure 11, the rear end of the grates has a vertical wall 40, instead of a sloping wall such as 26 aforesaid. In other resspects, the construction is similar to that shown in Figure 7 and similar reference numerals are used.

In the apparatus shown in Figure 12, the air conduits 20 are provided at the sides of the trays only and the exit openings or slots 25 for the cooling air are confined to their inner-side wall 41, with corresponding inlet openings 19 in the bottom 18 of the trays 10 adjacent the sides thereof. There is only one compartment 28 between the air conduits in each tray and cross bars, such as 42, may be provided for supporting the grate sections. The compartment 28 will be open at the ends as before. Two cooling air chambers 36a are provided which may be served by a bifurcated supply duct or by separate supply conduits 37a.

In the apparatus illustrated in Figures 13 and 14, a single air conduit 20 is employed in each tray 10 and extends tranversely of the series of trays and right across the tray. The grates 21 as well as the bottoms 18 of the trays are sectional as in Figures 2–4. The inlet openings 19 to the air conduit of each tray, from a cooling air chamber (not shown) arranged beneath the trays as in Figure 1, are similarly disposed transversely in the bottom 18 of the tray. The exit openings or slots 25 for the cooling air from the air conduit are formed in the forward side wall 43 of such conduit. The rearward side wall 44 of the air conduit is closed (i. e. unprovided with grate apertures) although it forms a sloping rear end part of the grate 21 of the tray. The grates thus have the grate apertures 22 only on the forward side of the air conduit where the grate of each tray lies over a single fines compartment 28 open at its forward end as will be understood from Figure 13. If desired, instead of the air conduit being a single conduit extending rightacross the trays as in Figures 13 and 14, several transverse air conduits may be provided for each tray by closing off the conduit portion of each section of the sectional grate at the opposite edges of the sections. Each such transverse air conduit would have its own single air inlet opening 19, single air outlet opening 25, and single fines compartment 28. Of course, in the construction shown in Figures 13 and 14, the single fines compartment 28 could be divided by longitudinal partitions which could be arranged to assist support of the forward part of the grates 21 on the bottom of the trays.

It will be apparent that other constructions of apparatus comprising one or more of the cooling medium conduits, and of the forwardly open fines collecting spaces or compartments, in the trays can be provided without departing from the scope of the invention. For instance, in one such construction shown in Figure 15, the material-supporting grates 21 may be extended forwardly as a series of spaced-apart fingers 45. These provide a comb-like extension of the grate which suitably is continuous from side to side of the trays or pans. Preferably, the fingers are spaced apart a distance greater than the size of the largest pieces of material that fall through the grate itself and they may curve slightly downwardly to their free end as shown. This comb-like extension facilitates discharge of the cooled material from the bed while not interfering with the continuity of the bed and the desired cooling action. A somewhat similar construction is seen at 45 in Figures 13 and 14 except that the fingers there are not curved downwardly at their free end. In another construction, the vertical walls of the air conduit or conduits may be cast integrally with the bottom of the trays, in which case the grates may be entirely flat. Lastly, a construction is illustrated in Figure 16, according to which the air conduits 20 would run inclined to the sides of the trays. Such a construction may be applied so that, forwardly, the air conduits incline inwardly or outwardly, or some incline inwardly and some incline outwardly, with respect to the centre-line of the operative flight of the apparatus.

We are aware that louvres forming slots have been suggested for supporting lumpy material for cooling purposes using an apron-type cooling conveyor, gaseous cooling medium being supplied under suction or pressure to the space between the louvres.

The present invention avoids the use of louvred slots, a purpose of this and of the method of construction being to enable three important advantages to be obtained namely: (1) to equalise the distribution, over the area of the operative flight of the apparatus, of the intensity of the stream of gaseous cooling medium, (2) to permit fine agglomerated material to fall through the apertures in the grates and be retained on the bottom of the trays, thereby effecting separation thereof during cooling, and (3) to make the apparatus self cleaning and thereby avoid clogging and interference, with the efficient cooling effected by the apparatus, by the finer particles of agglomerated material.

We claim:

1. Apparatus for cooling sintered and other solid material of industrial processes, comprising a plurality of trays connected together in an endless series, means to cause said trays to travel in the longitudinal direction of said series, a grate or similar means of perforate nature disposed on, but spaced above the bottom of, each of said trays to support said solid material during said travel of the trays, said grate or similar means comprising an imperforate region as well as a perforate region, partition means disposed between said grate or similar means of each of said trays and the bottom of such tray to form immediately under said imperforate region a conduit to which gaseous cooling medium has entry through an aperture in the bottom of said tray, and an air circulating device operative to supply said gaseous cooling medium to said conduit through said aperture, said partition means presenting an aperture disposed in the upper part thereof to allow delivery of said medium laterally from said conduit to beneath said perforate region of said grate or similar means, so that said medium obtains access to the solid material through said perforate region and material that falls through that perforate region collects on the bottom of the tray substantially entirely outside of said conduit, whereby the gaseous medium for the cooling of the material is supplied in one direction through the apertures in the bottom of the trays substantially without liability of material which falls through the grate of similar means escaping through such bottom in the opposite direction through such apertures.

2. Apparatus according to claim 1, wherein the partition means is arranged to form several of the cooling-medium conduits in each of said trays and such conduits extend lengthwise of said series and are spaced apart from one another transversely of such series.

3. Apparatus according to claim 1, wherein the partition means is arranged to form each of said trays with a cooling-medium conduit extending transversely of said series.

4. Apparatus according to claim 1, wherein the partition means is arranged to form each of said trays with a longitudinal cooling-medium conduit disposed in an inclined setting, in plan, with relation to the centre-line of said series.

5. Apparatus according to claim 1, wherein said grate or similar means of each of said trays is cast with depending parts forming the partition means and serving to space said grate or similar means above the bottom of the tray.

6. Apparatus according to claim 1, wherein the bottom of each of said trays is cast with upstanding parts forming the patition means and serving to space said grate or similar means above the bottom of the tray.

7. Apparatus according to claim 1, wherein each of said trays is constructed so that the space therein beneath the perforate region of said grate or similar means is forwardly open for discharge of the material on the bottom of the tray at the end of the operative flight of the apparatus.

8. Apparatus according to claim 1, wherein the partition means is arranged to form cooling-medium conduits within, and along the sides only, of each of said trays and the apertures in the partition means for lateral delivery of the gaseous cooling medium are on the innerside of such conduits, the space between said conduits and beneath the perforate region of said grate or similar means serving for collection of the material which falls through such perforate region.

9. Apparatus according to claim 1, wherein the said grate or similar means is extended forwardly in comb-like fashion as a series of spaced-apart fingers.

10. Apparatus according to claim 1, wherein the said grate or similar means is extended forwardly in comb-like fashion as a series of spaced-apart fingers which are curved downwardly to their free end.

11. Apparatus according to claim 1, wherein the said grate or similar means is extended forwardly in comb-like fashion as a series of spaced-apart fingers which are spaced apart a distance greater than the size of the largest pieces of material that fall through other parts of said grate or similar means.

References Cited in the file of this patent
UNITED STATES PATENTS

| | | |
|---|---|---|
| 1,089,153 | Plock | Mar. 3, 1914 |
| 1,102,982 | Dwight | July 7, 1914 |
| 2,103,170 | Newhouse et al. | Dec. 21, 1937 |
| 2,174,338 | Warner | Sept. 26, 1939 |
| 2,710,183 | Urban | June 7, 1955 |